United States Patent [19]

Ney et al.

[11] Patent Number: 5,110,172
[45] Date of Patent: May 5, 1992

[54] VERTICALLY RETRACTABLE SOFT OR FLEXIBLE TAILGATE FOR A PICKUP TRUCK

[75] Inventors: Clyde W. Ney, Waterford, Mich.; Genaro Prats, Mission Viejo, Calif.

[73] Assignee: Chrysler Corporation, Highland Park, Mich.

[21] Appl. No.: 627,684

[22] Filed: Dec. 14, 1990

[51] Int. Cl.⁵ .............................................. B62D 25/00
[52] U.S. Cl. ................................. 296/50; 296/180.1; 160/120
[58] Field of Search ................... 296/50, 52, 216, 100, 296/98, 180.1; 160/120, 133, 238, 268.1, 274

[56] References Cited

U.S. PATENT DOCUMENTS

| | | | |
|---|---|---|---|
| 3,814,164 | 6/1974 | Kuss | 160/120 |
| 4,252,362 | 2/1981 | Campbell | 296/98 |
| 4,930,834 | 6/1990 | Moore | 296/50 |
| 4,932,705 | 6/1990 | Miller | 296/50 |

*Primary Examiner*—Robert R. Song
*Attorney, Agent, or Firm*—Mark P. Calcaterra

[57] ABSTRACT

A pickup truck has a vertically movable tailgate assembly. The tailgate assembly includes a rigid cross beam along with a flexible net. The tailgate is automatically moved along a track from its raised to its lowered position.

14 Claims, 3 Drawing Sheets

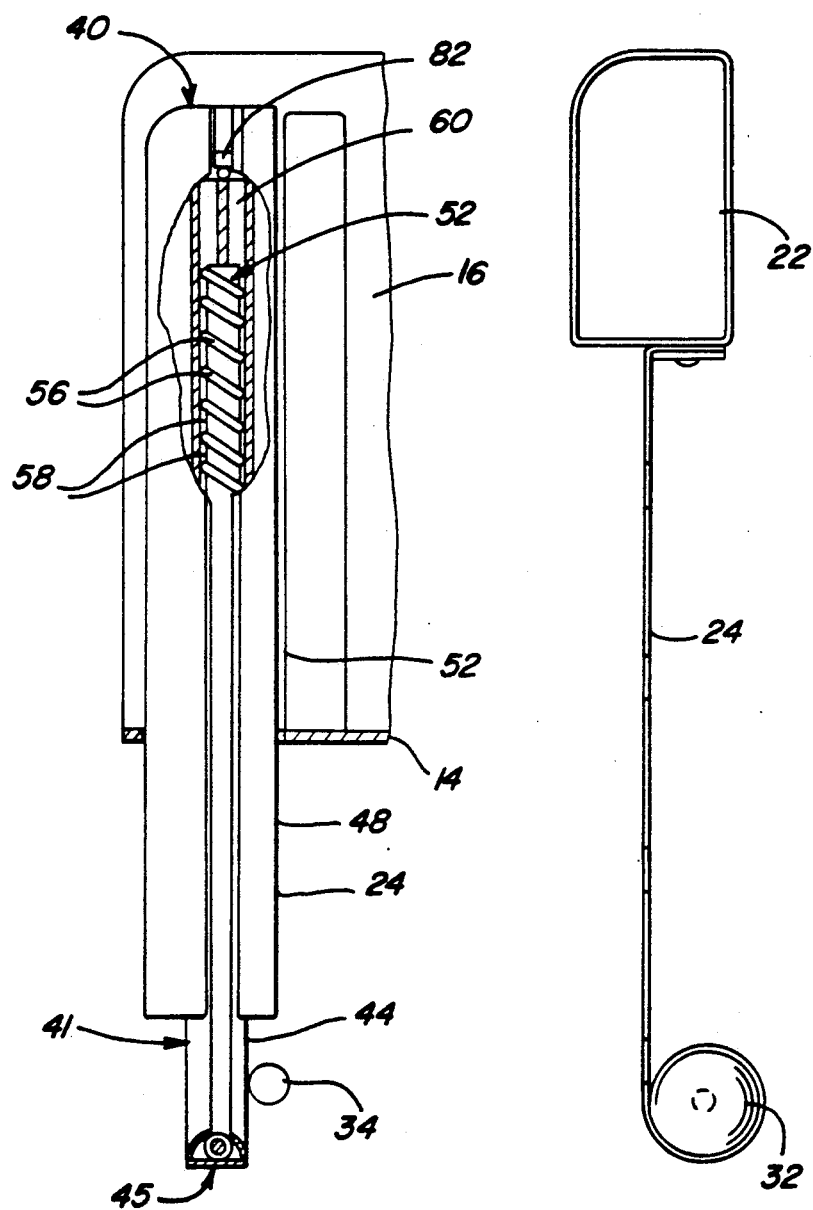

ced to a reeling mechanism 30 as best seen in FIGS. 3 and 7.
VERTICALLY RETRACTABLE SOFT OR FLEXIBLE TAILGATE FOR A PICKUP TRUCK

BACKGROUND AND SUMMARY OF THE INVENTION

The present invention relates to pickup trucks and, more particularly, to soft or flexible tailgates.

Pickup trucks and sport trucks generally have an open bed with solid side walls and a hinged solid metal tailgate. The tailgate is lowered for loading and unloading operations and is fixed in a vertical position for running operations. An object of this tailgate is to prevent objects from falling off the rear of the truck bed.

The disadvantage has long been widely recognized in the field. In response, a market has developed for a net to replace the solid barrier. The net can stop many or most articles from falling out of the bed of the pickup. There are, however, shortcomings in the known nets which has led to poor appearance, noisiness, and accelerated wear. Even so, a considerable demand exists for even these products because of their advantages they provide especially their lower weight.

The existing tailgate nets suffer from several widely recognized problems. They are not self supporting in any way and rely on tension created by elastic inlays or the tensioning of individual horizontal webbing straps to try to create a flat tailgate shape. The nets are manually retained on the vehicle and often must be removed to load and unload cargo into the bed of the truck. Also, these nets are not retained by the vehicle once they are removed.

The present invention provides the art with a tailgate barrier overcoming the disadvantages of the present art. The tailgate barrier of the present invention provides the art with a tailgate which may be vertically raised and lowered. The tailgate includes a net portion which is movable along tracks on the bed side walls and is wound about a reeling mechanism as the tailgate is raised and lowered. The present invention provides a cross beam connected to the net bridging the side walls of the pickup truck bed in a raised position and which is flush with the bed in a lowered or storage position. The tailgate is power operated and automatically moves between its raised and lowered positions upon activation of a switch.

From the following detailed description taken in conjunction with the accompanying drawings and subjoined claims, other objects and advantages of the present invention will become apparent to those skilled in the art.

BRIEF DESCRIPTION OF THE DRAWINGS

FIG. 5 is a section view of the cross beam and tack coupling, the section being taken along line 5—5 of FIG. 3.

FIG. 6 is an elevation view of the track with portions broken away, the section being taken along line 6—6 of FIG. 3.

FIG. 7 is a section view of the tailgate, the section being taken along line 7—7 of FIG. 3.

DETAILED DESCRIPTION OF THE PREFERRED EMBODIMENT

Figure 1:
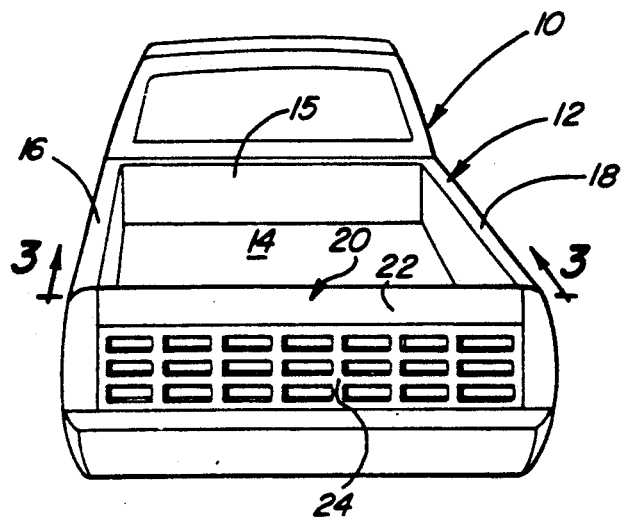
FIG. 1 is a perspective view of a pickup truck bed including the tailgate of the present invention in a raised position.

Turning to the Figures, particularly FIG. 1, a pickup truck with a tailgate in accordance with the present invention is illustrated. The pickup truck 10 includes a bed 12 having a horizontal floor 14, cross wall 15, and side walls 16 and 18. The tailgate 20 encloses the bed 12 at the end of the side walls 16 and 18 opposite the cross wall 15. The tailgate 20 is moved between a raised position, FIG. 1, to a lowered position, FIG. 2, where the tailgate 20 is flush with the floor 14 of the cargo bed 12.

The tailgate 20 includes a cross beam 22 and a net 24. The cross beam 22 spans the width of the bed 12 and is movably coupled with the side walls 16 and 18. The cross beam 22 is hollow and manufactured from sheet metal material. In its raised position, the cross beam 22 provides an aesthetic appealing appearance bridging the bed width between the side walls 16 and 18 at their top as seen in FIG. 1. The net 24 is manufactured from a soft, flexible and durable material which is capable of being wound about a reel. The net 24 has one end secured to the cross beam 22 and its other end secured to a reeling mechanism 30 as best seen in FIGS. 3 and 7.

The reeling mechanism 30 is positioned below the bed floor 14 aligned with the tailgate 20. Generally, the reeling mechanism 30 is of the spring loaded type, like those winding mechanism found in the window shade art having a reel 32 with side reeling supports 34 and 36. The reeling mechanism 30 does not include indexing features to stop the winding of the net. However, the reeling mechanism 30 winds and unwinds the net as it moves between its raised and lowered positions and serves to keep constant tension on the net 24 to maintain a substantially taut vertical appearance.

Figure 3:
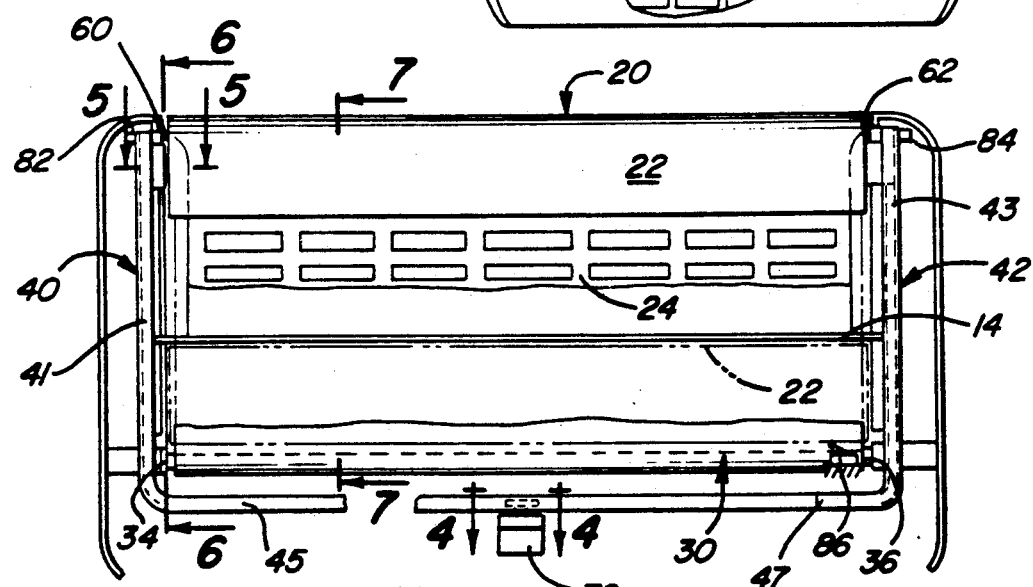
FIG. 3 is an elevation view partially in section of the tailgate of the present invention along line 3—3 of FIG. 1.

A pair of track members 40 and 42 are positioned on side walls 16 and 18 opposing one another as seen in FIG. 3. The track members 40 and 42 are elongated and have an overall L-shape. The vertical portions 41 and 43 of the "L" runs from the top of the side wall down below the bed floor 14 with the horizontal portions 45 and 47 position underneath the bed floor as seen in FIG. 3. The horizontal portions 45 and 47 also serve to house the cable when the tailgate 20 is in its lowered position. The track members 40 and 42 include a housing 44 and 46 with channels 48 and 50 having cables 52 and 54 movable therein. The vertical portions 41 and 43 of the tracks 40 and 42 are inlaid into the side walls 16 and 18 and are substantially flush therewith as illustrated in FIGS. 5 and 6. The tracks 40 and 42 provide a path of travel for the cross beam 22 as it moves between its raised and lowered positions.

The cross beam 22 includes a pair of sliders 60 and 62 on its ends coupled with cables 52 and 54. The sliders 60 and 62 are slidable within channels 48 and 50 of the tracks 40 and 42. The sliders 60 and 62 are bolted or the like with the cross beam 22 as seen in FIG. 5.

Figure 2:
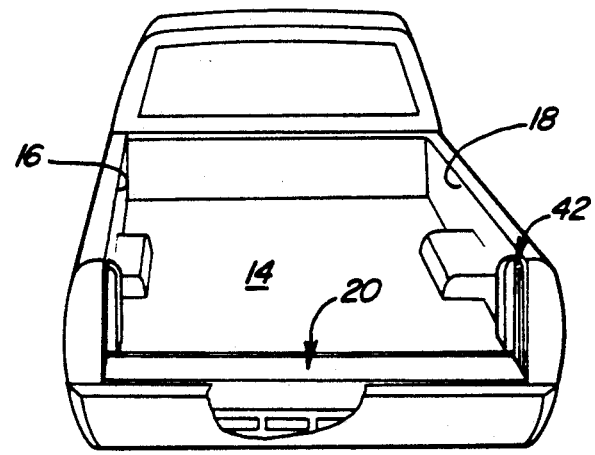
FIG. 2 is perspective view like that of FIG. 1 with the tailgate in a lowered position.
Figure 4:
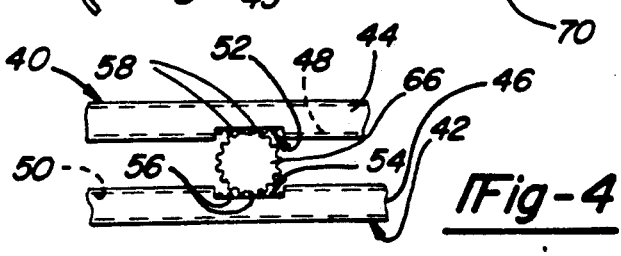
FIG. 4 is an elevation view of the motor pinion and track mechanisms, the section being taken along line 4—4 of FIG. 3.

The cables 52 and 54 have a surface with alternating raised 56 and recessed 58 portions as seen in FIGS. 4 and 6. The alternating raised 56 and recessed 58 portions provide for meshing with a pinion gear 66 driven by motor 70. The motor 70 rotates pinion gear 66 which, in turn, drives the cables 52 and 54 in the track housing channels 48 and 50. The motor 70 is a reversible motor driven in a first direction to raise the tailgate 20 to its fully up position and driven in a reversed direction to lower the tailgate to its fully lowered position flush with the bed as seen in FIG. 2. The tailgate 20 actuates limit switches 82 and 86 in its raised and lowered positions, respectively, controlling the motor 70 as will be explained herein.

Figure 8:
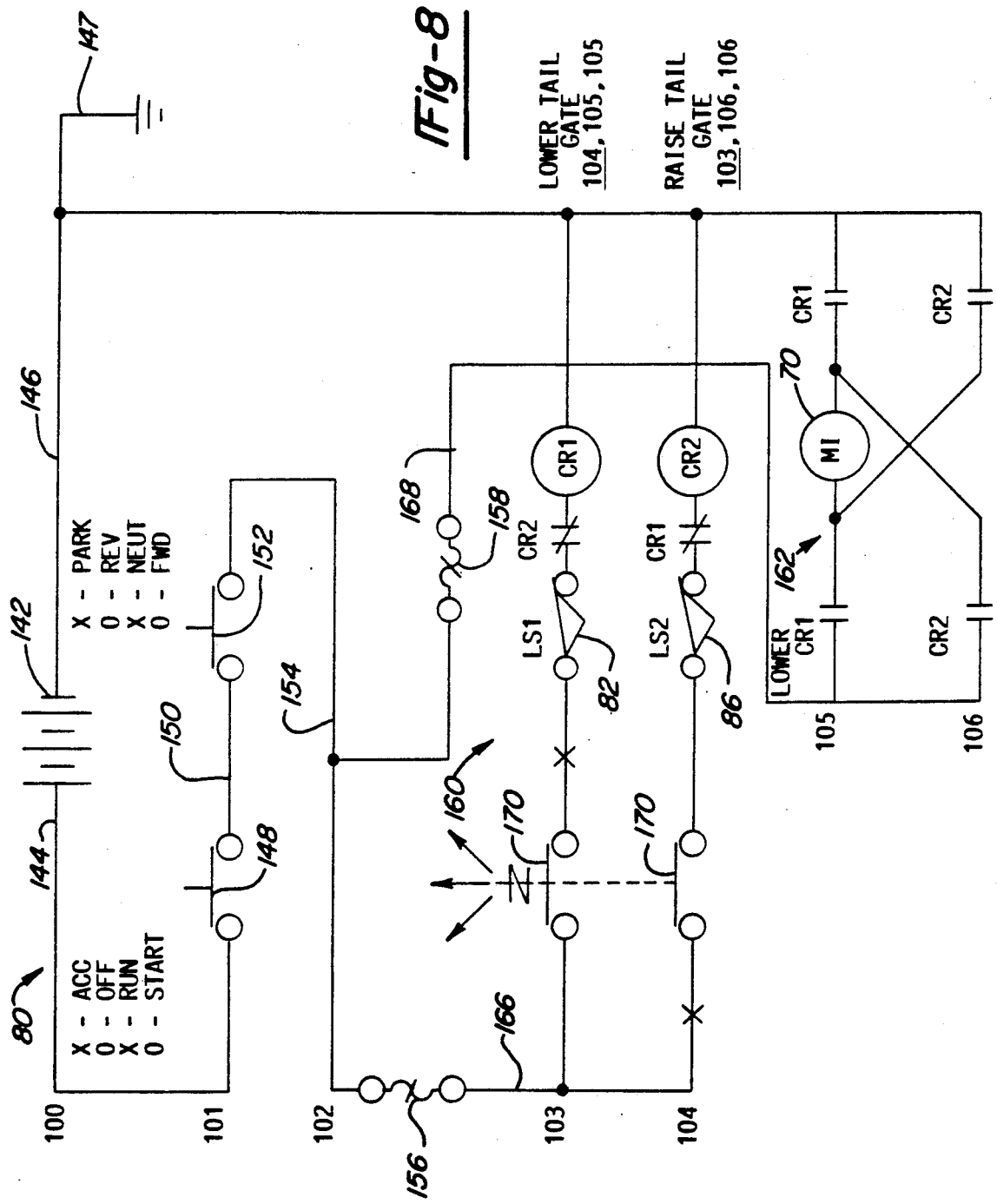
FIG. 8 is a schematic diagram in relay diagram form of an electrical control circuit which may be used to operate the automatic tailgate system of the present invention.

The above described tailgate assembly is automatically actuated by a controller like that schematically illustrated in FIG. 8. The description of the controller will provide an understanding of the operation of the retractable tailgate 20.

FIG. 8 is a relay ladder diagram of one possible control circuit 80 for automatically operating the tailgate 20 via a simple spring-loaded rocker switch or a set of pushbuttons pressed by the driver of the vehicle. The relay ladder diagram has line numbers on the left side of the Figures for crossreferencing purposes. The line numbers in which the contacts of relays appear have been listed generally to the right of the relays that control them, and normally closed contacts are indicated by underlining in the listings. For example, in FIG. 8, the relay CR1 is provided with three contacts, namely a normally closed contact on line 104, which is underlined, and normally open contacts on line 105, which are not underlined.

For convenience, in the electrical diagram of FIG. 8 the motor 70 is referred to as motor M1. The motor is shown on line 105 and consists of a bi-directional DC motor, whose direction of rotation is determined by the polarity applied to the leads of the motor. Similarly, the limit switches 82 and 86 are identified on the electrical diagram of FIG. 8, as limit switches LS1 and LS2. Those skilled in the art will appreciate that, while these devices are called limit switch, any conventional or suitable form of switch, including magnetic proximity switches, photoelectric detectors, pressure switches or the like may be used in place of these electrical switches, as long as the are set up to detect mechanical conditions equivalent to those presently detected by the limit switches.

FIG. 8 shows the vehicle battery 142, which may be at any conventional voltage such as 12 volts, connected to two conductors 144 and 146. Conductor 146 may be grounded as indicated by ground symbol 147. Conductor 144 delivers power to a conventional four position ignition switch, which may be closed in the "accessories" and "run" positions, and open in the other two positions, namely "off" and "start". Conductor 150 is connected between switch 148 and a conventional electrical switch mounted to the vehicle transmission, which may be set up to be closed only when the transmission is in the "park" position, as indicated in FIG. 8. When switches 148 and 152 are closed, power flows from conductor 144 to conductor 154 and on through conventional automotive fuses 156 and 158 to two branch circuits, namely relay control circuit 160 found on lines 103 and 104 and motor circuit 162 found on lines 105 and 106. Relay control circuit 160 receives its electrical power from conductors 166 and 146, while motor circuit 162 receives its electrical power from conductors 168 and 146.

To operate the circuit 160, a person within the vehicle containing the present invention must actuate three-position, spring-returned-to-center rocker switch 170 shown on lines 103 and 104. Those in the automotive art will appreciate that other actuation devices, such as one or more sets of pushbuttons at one or more locations on the vehicle may be used in place of switch 170. Rocker switch 170 (or the alternative pushbuttons) may be mounted in any convenient location on the vehicle, including on the dashboard, on the center console, on the inner liner of the passenger compartment, or even on the exterior of the vehicle if desired.

The control system 80 carries out two basic automatic sequences. The first sequence automatically moves the tailgate 20 from its raised position as in FIG. 1, to its storage position. The second automatic sequence moves the tailgate 20 from its storage position as in FIG. 2, to its raised position. In both automatic sequences, the operator of the vehicle must hold switch 170 in the desired position to have the electrical circuit 80 carry out the automatic sequence of operation. If the operator removes his or her finger from the switch 170, the switch 170 automatically returns to its center position, and any motion of the tailgate 20 that is in progress stops immediately. Either sequence may be resumed if interrupted simply by reactuating the switch 170 in the desired direction.

The automatic sequence for placing the tailgate 20 in storage begins with the operator pressing the rocker switch 170 into its "store" position, thus closing the switch contact on line 103 and energizing control relay CR1. This opens the normally-closed contact CR1 on line 104, thus preventing relay CR2 from energizing. Closing the contact CR1 on line 103 causes relay CR1 to energize, which in turn causes the contacts CR1 on line 105 to close, thus providing electrical power to the motor M1 in a direction which causes the motor to lower the tailgate 20. Once the tailgate 20 has been lowered completely, the normally-closed limit switch LS1 on line 103 opens, thus de-energizing relay CR1, which stope motor M1.

The second automatic sequence carried out by control circuit 80 is for raising the tailgate 20 from storage into its raised position. This sequence begins with the closure of the second contact of switch 170 on line 104, caused by the vehicle driver pressing switch 170 into its "return" position. This causes control relay CR2 to energize. When relay CR2 is one, the normally open contacts CR2 on line 106 are closed. The circuit path on line 106 is therefore completed, thus energizing relay CR2, which starts motor M1 on line 105. When the tailgate 20 is raised fully, normally-closed limit switch LS2 on line 104 opens, thus de-energizing relay CR2, which stops motor M1.

Even if the vehicle operator keeps the switch 170 in its "return" position, nothing further will happen, due to limit switch LS2 being open and thus de-energizing CR2.

While a relay circuit 80 has been described for operating the motorized tailgate system of the present invention, those skilled in the automotive art will readily appreciate that a dedicated solid-state electronic circuit which performs the same functions may also be designed and built to perform the logic functions of relay circuit 160. Similarly, a digital microcontroller including a microprocessor and a suitable number of input and outputs may be used to implement the logic functions of circuit 160 instead of electromechanical relays or discrete solid-state electronic circuits. Further, those skilled in the art will appreciate that the logic and timing of a control circuit to implement the present invention may be varied to considerable degree as long as the basic sequence of mechanical movements required to operate the tailgate 20 are carried out.

While the above detailed description provides a preferred embodiment of the present invention, it should be understood that the present invention is susceptible to modification, variation, and alteration without deviating from the scope and true meaning of the subjoined claims.

What is claimed is:

1. A movable tailgate for a pickup truck with side walls comprising:
    a tailgate formed from a windable material includes a rigid cross member to be connected to an upper edge of said windable material;
    track means for providing movement of said tailgate between a raised position and a lowered position, said tailgate coupled with said track means for movement between said raised and lowered positions and said track means adapted to be coupled with the pickup truck side walls; and
    reel means for enabling said tailgate to wind around said reel means when said tailgate is moving between said raised and lowered positions.

2. The tailgate according to claim 1 wherein said tailgate includes a durable cloth-like material providing easy winding about said reel means.

3. The tailgate according to claim 1 wherein said track means includes a pair of track members adapted to be positioned on opposing sides of a truck bed, said track members including a cable movable in said track members and a motor for driving said cables in said track members.

4. The tailgate according to claim 3 wherein a switch means for automatically raising and lowering said tailgate is coupled with said motor for actuating said motor for moving said tailgate between said raised and lowered positions.

5. A movable tailgate assembly for a pickup truck comprising:
    a tailgate including a rigid cross beam and a windable net coupled at upper end with said rigid cross beam;
    a pair of track members adapted to be coupled with opposing sides of a truck bed, said track members each having a movable cable associated with said cross beam for moving said cross beam between a raised and lowered position; and
    a reel coupled with the lower end of said net for winding and unwinding said net about said reel as said tailgate moves between its raised and lowered positions.

6. The tailgate according to claim 5 wherein said track members include a channel, said cable being movably disposed within said channel.

7. The tailgate according to claim 6 wherein a slider is movably positioned in said channel and associated with said cable and said rigid cross beam such that said slider is moved in said channel by said cable which, in turn, moves said cross beam between its raised and lowered positions.

8. The tailgate according the claim 5 wherein a motor is coupled with said cables for moving the cables in said track members.

9. A pickup truck having a bed with side walls extending along the longitudinal edges of the bed opposing one another and a tailgate assembly comprising:
    a pair of track members positioned on said side walls opposing one another;
    a movable cable in said track members;
    a tailgate assembly including a rigid cross beam coupled with said movable cables for raising and lowering said cross beam, and a net having upper and lower ends said upper end coupled with said cross beam;
    a reel mechanism coupled with said lower end of said net for winding and unwinding said net as said cross beam moves between its raised and lowered position; and
    drive means for automatically raising and lowering said cross beam, said switch means associated with said cables for moving said cables in said track members.

10. The pickup truck according to claim 9 wherein said drive means include a motor operative to drive said cables and switch means for controlling operation of said motor.

11. The pickup truck according to claim 10 wherein said cables have alternating raised portions and recessed portions for enabling a pinion coupled with said motor to drive said cables.

12. The pickup truck according to claim 9 wherein said track members are elongated and have an overall L-shape extending vertically from the top of the side walls to the bed floor and horizontally beneath the bed floor.

13. The pickup truck according to claim 9 wherein said cross beam is substantially flush with said bed in its lowered position.

14. The pickup truck according to claim 9 wherein said reel mechanism is positioned below said bed.

* * * * *